Feb. 4, 1947. W. H. GRAEBNER ET AL 2,415,387
PACKAGING HYGROSCOPIC MATERIAL
Filed Jan. 24, 1944
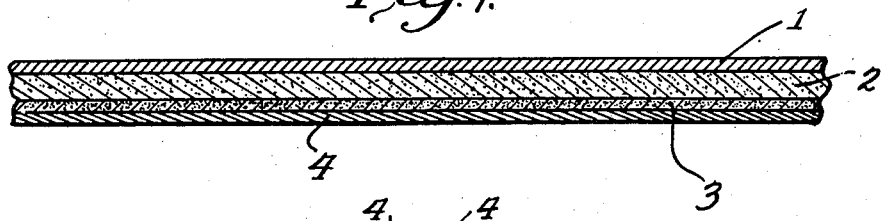
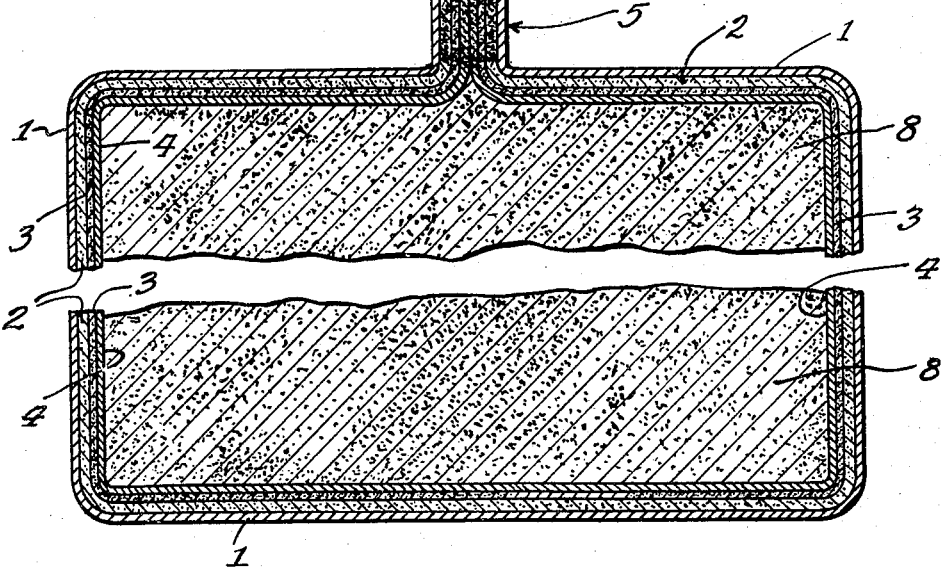
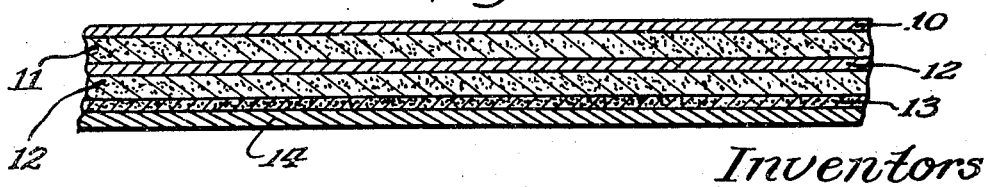
Inventors
Winfred H. Graebner
and Russell C. Flom.
By Joseph Rossman
Atty.

Patented Feb. 4, 1947

2,415,387

UNITED STATES PATENT OFFICE 2,415,387

PACKAGING HYGROSCOPIC MATERIALS

Winfred H. Graebner, Neenah, and Russell C. Flom, Menasha, Wis., assignors to Marathon Corporation, a corporation of Wisconsin Application January 24, 1944, Serial No. 519,524

12 Claims. (Cl. 206—46)

This invention relates to packaging of hygroscopic materials with laminated sheet materials. More specifically, this invention relates to packages made of sheet materials having a plasticizer incorporated in the innermost sheet which is retained or sealed in the sheet by special coatings provided on the surface of the sheet presented or arranged on the interior of the package to prevent substantial loss or escape of the plasticizer by contact of said sheet with the packaged hygroscopic materials.

Further details and advantages of the invention will be apparent from the following specification and drawing wherein Figure 1 is a cross-sectional view of a laminated sheet used for making packages in accordance with our invention, Figure 2 is a sectional view of a package utilizing the laminated sheet material illustrated in Figure 1, and Figure 3 is a cross-sectional view of another modification of a laminated sheet material used for making packages in accordance with our invention.

Referring to the drawing, Figure 1 illustrates a laminated sheet material adapted for packaging hygroscopic materials in accordance with our invention. Such sheet material is made of an outer sheet 1 of any suitable fabricated sheet material, such as paper, metal foil, regenerated cellulose, cellulose acetate, rubber hydrochloride, ethyl cellulose, woven textiles and other commercially available fabricated and synthetic sheets, foils and films. Sheet 1 is laminated to a second cellulosic sheet 3 by any suitable adhesive 2, preferably thermoplastic in character, such as waxes, resins, lacquers and the like. We prefer to laminate sheets 1 and 2 by means of microcrystalline waxes or paraffin wax to which may be added rubber, gums, resins and other suitable elastomers or film-forming ingredients in suitable amounts.

Laminated sheet materials of the character described are particularly adapted for making flexible containers or bags of any suitable construction for packaging hygroscopic materials. In order that such packages may be handled, shipped and stored without deterioration of the contents and breakage or damage to the sheet materials used it is important that the packaged hygroscopic materials do not substantially absorb any components in the sheet materials so as to change the original physical characteristics of such sheet materials. For example, in order to provide a very flexible and pliable type of container, it is necessary to use an inner cellulosic sheet 3 presented on the interior of the package which is plasticized with a suitable ingredient such as polyhydric alcohols, glycerol, invert sugars, sorbitol, water, phthalic acid esters, mineral oils, organic acids of phosphoric acids and other known plasticizers suitable for cellulosic sheets in amounts from 0.5 to 100% by weight of the sheet, depending upon the degree of pliability desired. When water or moisture-sensitive sheet materials, such as glassine or kraft paper, are used as the innermost sheet which is presented on the interior of the package the pliability and strength of such sheet materials are seriously impaired upon substantial loss or escape of their plasticizer content after contact with hygroscopic materials in the package.

When such sheets are brought into direct contact with hygroscopic materials, such as dried milk, dehydrated soups, malted milk preparations and the like, the plasticizer therein will be removed and absorbed by the hygroscopic material at a very rapid rate, so that in time the sheet 3 presented on the interior of the package and in contact with the packaged hygroscopic material will become brittle, lose its strength and will rupture on handling, thus resulting in loss of the contents or deterioration thereof.

In order to avoid this difficulty, we provide a continuous protective barrier coating of suitable composition and thickness, indicated by numeral 4 in Figure 1, on the surface of the inner sheet 3 which is presented on the interior of the final package made from our sheet material. This layer may be formed of a moisture-proof, vapor-proof and thermoplastic coating film or coating, such as paraffin wax containing about 1 to about 30% by weight of rubber or other elastomers such as isobutylene polymers; microcrystalline waxes alone or containing added ingredients such as aluminum stearate in amounts from about 1 to about 20% by weight, gums, resins, lacquers, chlorinated rubber, ethyl cellulose and the like. It is advantageous to utilize a thermoplastic and heat-sealable type of layer to assist formation of seams when the package is sealed as will be explained later. The barrier film 4 serves to retain or seal in the plasticizer in the sheet 3 so that it will not escape or be removed substantially from the sheet 2 when a package is formed such as illustrated in Figure 2. The inner barrier film 4 forming the interior surface of the package will thus substantially preserve the flexibility, pliability and strength of the inner sheet 3 and prevent its deterioration.

The following are specific embodiments of our invention, the numerals preceding each designated component corresponding to the numerals shown in the drawings. Weights for each component are given in pounds per ream (480—24 x 36).

COMPONENT

Example 1

|   | Pounds weight per ream |
|---|---|
| 1. Kraft paper | 30 |
| 2. Microcrystalline wax M. P. 145-7° F. | 15 |
| 3. Regenerated cellulose | 20 |
| 4. Coating by wt. 3% aluminum stearate, 5% ester gum, 92% microcrystalline wax M. P. 145-7° F. | 15 |
| Total | 80 |

Example 2

|   |   |
|---|---|
| 1. Kraft paper | 30 |
| 2. Microcrystalline wax M. P. 145-7° F. | 16 |
| 3. Plasticized glassine | 24 |
| 4. Coating by wt. 3% aluminum stearate, 5% ester gum, 92% microcrystalline wax M. P. 145-7° F. | 16 |
| Total | 86 |

Example 3

|   |   |
|---|---|
| 1. Wet-strength kraft paper | 33 |
| 2. Microcrystalline wax M. P. 145-7° F. | 16 |
| 3. Regenerated cellulose | 20 |
| 4. Coating by wt. 3% aluminum stearate, 5% ester gum, 92% microcrystalline wax M. P. 145-7° F. | 16 |
| Total | 85 |

Our laminated sheet materials may be used for general packaging purposes and also may be converted into suitable receptacles, containers, bags, tubes, pouches and the like. As illustrated in Figure 2, bags may be made from our sheet material so as to present the barrier layer 4 on the interior surface thereof with which the hygroscopic material 8 is brought into contact. The bag may be formed of any desired known construction. In the construction shown in Figure 2 the upper seam portions 5 of the bag are folded so as to bring the coating layer 4 into face to face contact as shown in Figure 2. Heat and pressure may then be applied to the abutting portions to form a seam which will seal the package. Any other seam construction may of course be utilized if desired, such as by overlapping the seam portions. The seams may be heat-sealed by utilizing the thermoplastic layer 4 as illustrated in Figure 2, or by the use of adhesives applied at the seam areas.

It is to be understood that our invention is not restricted to any specific type of package or container construction. Our sheet material may be utilized in any type of known package or container construction, the sheet material being disposed and arranged so as to present the barrier layer 4 on the interior of the package or container for packaging hygroscopic materials.

We may utilize many different combinations of laminated sheet materials in producing containers and packages in accordance with our invention. For example, instead of two-ply sheet materials we may utilize three or more plies of any suitable sheet materials as shown in Figure 3 by numerals 10, 12 and 13, united by any desired suitable adhesive layers 11 and 12, respectively, and provided with a barrier or protective layer 14 on the face which is presented on the interior of the package made from such sheet material. This barrier layer 14 is formed from similar compositions as layer 4 previously described. The innermost sheet 13, for example, may be glassine or kraft paper containing a plasticizer, such as glycerine, which serves to impart flexibility and pliability to the sheet, or a plasticized sheet of regenerated cellulose. The protective layer 14 will prevent substantial loss of the plasticizer in the package as previously explained.

Packages of hygroscopic materials made from our sheet material as herein disclosed will protect the contents for unusually long periods of time against deterioration and spoilage. At the same time the container will not lose its strength, flexibility and protective value as the sheet material components are preserved against deterioration for the reasons previously explained.

Having described the essential features of our invention and the advantages thereof, we claim:

1. A package of hygroscopic material comprising a container wall formed of laminated sheets, the innermost sheet adjacent the packaged hygroscopic material containing a plasticizer, and a continuous thermoplastic barrier film comprising microcrystalline wax and of about 20% of the weight per ream of the combined sheet on the face of said sheet presented on the interior of the package adjacent said hygroscopic material to prevent substantial withdrawal or loss of said plasticizer and embrittlement of said innermost sheet.

2. A package of hygroscopic material comprising a container wall formed of laminated sheets, the innermost sheet adjacent the packaged hygroscopic material consisting of a cellulosic material and containing a plasticizer, and a continuous barrier film comprising microcrystalline wax and of about 15 lbs. or more per ream on the face of said sheet presented on the interior of the package adjacent said hygroscopic material to prevent substantial withdrawal or loss of said plasticizer and embrittlement of said innermost sheet.

3. A package of hygroscopic material comprising a container wall formed of laminated sheets, the innermost sheet adjacent the packaged hygroscopic material consisting of glassine and containing a plasticizer, and a continuous barrier film comprising microcrystalline wax and of about 15 lbs. or more per ream on the face of said sheet presented on the interior of the package adjacent said hygroscopic material to prevent substantial withdrawal or loss of said plasticizer and embrittlement of said innermost sheet.

4. A package of hygroscopic material comprising a container wall formed of laminated sheets, the innermost sheet adjacent the packaged hygroscopic material consisting of kraft paper and containing a plasticizer, and a continuous barrier film comprising microcrystalline wax and of about 15 lbs. or more per ream on the face of said sheet presented on the interior of the package adjacent said hygroscopic material to prevent substantial withdrawal or loss of said plasticizer and embrittlement of said innermost sheet.

5. A package of hygroscopic material comprising a container wall formed of laminated sheets, the innermost sheet adjacent the packaged hygroscopic material consisting of regenerated cellulose and containing a plasticizer, and a continuous barrier film comprising microcrystalline wax and of about 15 lbs. or more per ream on the face of said sheet presented on the interior of the package adjacent said hygroscopic material to prevent substantial withdrawal or loss of said plasticizer and embrittlement of said innermost sheet.

6. A package of hygroscopic material comprising a container wall formed of laminated sheets, the innermost sheet adjacent the packaged hygroscopic material containing a plasticizer, and a continuous barrier film of about 20% by weight per ream of the combined sheet comprising microcrystalline wax on the face of said sheet presented on the interior of the package adjacent said hygroscopic material to prevent substantial withdrawal or loss of said plasticizer and embrittlement of said innermost sheet.

7. A package of hygroscopic material comprising a container wall formed of laminated sheets, the innermost sheet adjacent the packaged hygroscopic material consisting of glassine and containing a plasticizer, and a continuous barrier film of about 15 lbs. or more per ream comprising microcrystalline wax on the face of said sheet presented on the interior of the package adjacent said hygroscopic material to prevent substantial withdrawal or loss of said plasticizer and embrittlement of said innermost sheet.

8. A package of hygroscopic material comprising a container wall formed of laminated sheets, the innermost sheet adjacent the packaged hygroscopic material containing a plasticizer, and a continuous barrier film of about 15 lbs. or more per ream comprising microcrystalline wax and aluminum stearate on the face of said sheet presented on the interior of the package adjacent said hygroscopic material to prevent substantial withdrawal or loss of said plasticizer and embrittlement of said innermost sheet.

9. A package of hygroscopic material comprising a container wall formed of laminated sheets, the innermost sheet adjacent the packaged hygroscopic material containing a plasticizer, and a continuous barrier film of about 15 lbs. or more per ream comprising wax and rubber on the face of said sheet presented on the interior of the package adjacent said hygroscopic material to prevent substantial withdrawal or loss of said plasticizer and embrittlement of said innermost sheet.

10. A package of hygroscopic material comprising a container wall formed of laminated sheets, the innermost sheet adjacent the packaged hygroscopic material containing a plasticizer, and a continuous barrier film of about 15 lbs. or more per ream comprising wax and about 1 to about 30% by weight of rubber on the face of said sheet presented on the interior of the package adjacent said hygroscopic material to prevent substantial withdrawal or loss of said plasticizer and embrittlement of said innermost sheet.

11. A package of hygroscopic material comprising a container wall formed of laminated sheets, the innermost sheet adjacent the packaged hygroscopic material containing a plasticizer, and a continuous barrier film of about 15 lbs. or more per ream comprising wax and an elastomer on the face of said sheet presented on the interior of the package adjacent said hygroscopic material to prevent substantial withdrawal or loss of said plasticizer and embrittlement of said innermost sheet.

12. A package of hygroscopic material comprising a container wall formed of laminated sheets, the innermost sheet adjacent the packaged hygroscopic material containing a plasticizer, and a continuous barrier film of about 15 lbs. or more per ream comprising wax and a modifier on the face of said sheet presented on the interior of the package adjacent said hygroscopic material to prevent substantial withdrawal or loss of said plasticizer and embrittlement of said innermost sheet.

WINFRED H. GRAEBNER.
RUSSELL C. FLOM.

REFERENCES CITED

The following references are of record in the file of this patent:

UNITED STATES PATENTS

| Number | Name | Date |
|---|---|---|
| 2,123,760 | Wilshire | July 12, 1938 |
| 2,282,258 | Snyder | May 5, 1942 |
| 2,301,128 | Landefeld | Nov. 3, 1942 |
| 2,178,447 | Burk, et al. | Oct. 31, 1939 |
| 1,964,793 | Richter | July 3, 1934 |
| 2,354,590 | Gilfillan, et al. | July 25, 1944 |
| 2,089,524 | Abrams, et al. | Aug. 10, 1937 |
| 2,348,689 | Abrams, et al. | May 9, 1944 |
| 1,826,557 | Lowe | Oct. 6, 1931 |